US011653291B2

(12) United States Patent
Vakil (10) Patent No.: US 11,653,291 B2
(45) Date of Patent: May 16, 2023

(54) SYSTEMS AND METHODS FOR USER-BASED RESOURCE ALLOCATION USING ORTHOGONAL FREQUENCY-DIVISION MULTIPLE ACCESS FUNCTIONALITY

(71) Applicant: Arista Networks, Inc., Santa Clara, CA (US)

(72) Inventor: Balram Ketan Vakil, Bengaluru (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 141 days.

(21) Appl. No.: 17/029,461

(22) Filed: Sep. 23, 2020

(65) Prior Publication Data

US 2022/0095206 A1 Mar. 24, 2022

(51) Int. Cl.
*H04W 48/14* (2009.01)
*H04W 84/12* (2009.01)
*H04W 8/22* (2009.01)
*H04W 72/04* (2023.01)
*H04L 5/00* (2006.01)

(52) U.S. Cl.
CPC .......... *H04W 48/14* (2013.01); *H04L 5/0007* (2013.01); *H04L 5/0037* (2013.01); *H04W 8/22* (2013.01); *H04W 72/04* (2013.01); *H04W 84/12* (2013.01)

(58) Field of Classification Search
CPC ....... H04W 48/14; H04W 8/22; H04W 72/04; H04W 84/12; H04L 5/0007; H04L 5/0037
See application file for complete search history.

(56) References Cited

U.S. PATENT DOCUMENTS

| | | | | |
|---|---|---|---|---|
| 10,911,453 | B2* | 2/2021 | Pularikkal | H04L 63/083 |
| 2007/0082654 | A1* | 4/2007 | Hovnanian | H04W 12/50 455/410 |
| 2012/0192258 | A1* | 7/2012 | Spencer | H04W 8/18 726/7 |
| 2014/0321274 | A1* | 10/2014 | Gahm | H04L 47/193 370/231 |
| 2016/0301617 | A1* | 10/2016 | Peterson | H04L 47/52 |
| 2016/0330715 | A1* | 11/2016 | Chen | H04L 27/2602 |
| 2020/0344772 | A1* | 10/2020 | Munirathinam | H04L 41/5022 |

* cited by examiner

*Primary Examiner* — Sharmin Chowdhury
(74) *Attorney, Agent, or Firm* — Fountainhead Law Group P.C.

(57) ABSTRACT

Systems and methods are provided herein for providing user-based resource allocation using OFDMA functionality. This may be accomplished by a WAP receiving a request for access to a network from a first device, wherein the first device is configured to communicate with the WAP using OFDMA. The request for access comprises an identifier and role associated with the first device. The WAP then determine if a second device associated with the same identifier as the first device is being allocated one or more RUs for communicating with the network. If there is a second device associated with the identifier being allocated RUs for communicating with the network, the WAP determines a number of one or more RUs to provide to the first device based on the role associated with the first device and one or more conditions stored in a database.

20 Claims, 8 Drawing Sheets

| Username | No. of Devices | More than Two Devices | MAC | Role | RUs Allocated |
|---|---|---|---|---|---|
| User 1 | 3 | Yes | MAC-S1 | Full Access | More than 1 if available, but at least 1 |
| | | | MAC-S2 | Limited Access | Not more than 1 |
| | | | MAC-S3 | Limited Access | Not more than 1 |
| User 2 | 2 | No | MAC-S4 | Full Access | More than 1 if available, but at least 1 |
| | | | MAC-S5 | Limited Access | More than 1 if available, but at least 1 |
| User 3 | 1 | No | MAC-S6 | Full Access | More than 1 if available, but at least 1 |

| Username | Conditions |
|---|---|
| User 1 | No more than three RUs to be allocated to User 1 |
| | Maximum allocation of two RUs per device |
| | If two devices or less, provide maximum RUs |
| | If more than two devices, devices with a full access role will be allocated at least one RU and more if available and devices with a limited access role will be allocated only one RU. |
| User 2 | No more than five RUs to be allocated to User 2 |
| | Maximum allocation of three RUs per device |
| | If two devices or less, provide maximum RUs |
| | If more than two devices, devices with a full access role will be allocated at least one RU and more if available and devices with a limited access role will be allocated only one RU. |
| ... | ... |

SYSTEMS AND METHODS FOR USER-BASED RESOURCE ALLOCATION USING ORTHOGONAL FREQUENCY-DIVISION MULTIPLE ACCESS FUNCTIONALITY

BACKGROUND

The present disclosure relates to the allocation of bandwidth, and in particular to systems and methods for using condition-based orthogonal frequency-division multiple access (OFDMA) functionality in allocating bandwidth to devices.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

SUMMARY

Wireless local area networks (WLANs) have become critically important for the daily operation of many organizations. Universities, corporate headquarters, or any type of campus where multiple users require access to a network for daily operations depend on WLANs. There are different types of WLAN solutions such as, for example, corporate-owned and personally enabled (COPE), choose your own device (CYOD), and bring your own device (BYOD). A WLAN using COPE grants users access to devices that are fully owned and provided by the entity supporting the WLAN (e.g., university, company, etc.). The COPE method allows for increased security as the entity is able to configure devices that are allowed access to the network before assigning the devices to users. This method can be costly and is not a viable option for most entities. A WLAN using CYOD allows a user to choose a device from a set of pre-approved devices. This method also allows for increased security as the entity is able to configure the devices that are allowed access to the network before assigning the device to the users, but this method is just as costly and is not a viable option for most entities. A WLAN using BYOD allows users to bring their own personal devices and use them to access the network. BYOD is the most cost-effective solution for the entity providing the WLAN and has been widely implemented. Most WLANs today offer BYOD solutions. A WLAN using BYOD does not exclude an entity from providing devices to the users. A WLAN using BYOD may provide varying levels of access to the WLAN based on the device requesting access. For example, a device that was provided by the entity may be allotted full access to the WLAN while a personal device that was not provided by the entity will be allotted only limited access to the WLAN.

In a WLAN using BYOD, there is often a process to authenticate the user device before allowing the device access to the WLAN. Traditionally, this has been done using some type of login system. For example, a user inputs credentials which, if authenticated, allow the user's device access to the WLAN. A network may rely on OFDMA functionality, which allows multiple devices to communicate with an access point at the same time. Essentially, OFDMA divides a transmission channel into many subchannels, where each device uses a subchannel. This allows multiple devices to share a single channel, opening up bandwidth resources for other devices. In some systems, OFDMA functionality relies on the allocation of Resource Units (RUs). A RU, is a unit that denotes a group of bandwidth subcarriers used in both uplink and downlink. Traditional network approaches use static or inefficient methods when assigning RUs to devices (e.g., first come, first served approach). These traditional approaches lack the ability to allocate RUs in the aggregate across users that are allowed access to the network, and they lack the ability to provide specific and dynamic allocation of RUs on a per-user basis. Traditional approaches allow all devices that are related to a single user to access the network using the same number of RUs regardless of the device type. For example, a private mobile phone and an entity-provided laptop may be provided the same number of RUs resulting in an inefficient allocation. As new devices are granted access to the network, traditional approaches lack a dynamic system that updates the number of RUs provided to devices that are already accessing the network. As the number of users requesting access to a network increases, these problems are further magnified.

Various systems and methods described herein address these problems by providing a method of user-based resource allocation using OFDMA functionality. Although the systems and methods described herein refer specifically to OFDMA, any modulation scheme that allows multiple user devices to access the network by allocating subsets of subcarriers may be used. When a first device goes through BYOD authentication, the first device will be associated with an identifier and will also receive a role from an authentication, authorization, and accounting (AAA) server.

The identifier may be associated with the credentials (e.g., identification number, password, etc.) used to authenticate the first device. The identifier may be any identifier that can be used to associate the first device with a user. For example, the identifier may be a username, MAC address, email address, vendor-specific attribute (VSA), digital certificate, session ID, and/or any other similar such information. The role can be based on whether the device is a personal device or an entity-provided device. In some embodiments, the role may indicate the amount of access the first device is allotted to the WLAN. For example, a personal device may receive a "limited access" role where the personal device is able to access the WLAN only in order to receive internet connectivity, whereas a device provided by the entity supporting the WLAN may receive a "full access" role, allowing the device unrestricted access to the WLAN.

After the first device is authenticated and receives a full access role from the AAA server, the first device sends an access request to the wireless access point (WAP). The access request includes the identifier and role associated with the device and can include additional identifying information (e.g., MAC address, authentication information, etc.) related to the first device. The WAP determines if there are any other devices that have received access to the network, where the other devices are associated with the same identifier that the first device is associated with. If there are no such devices, then the first device is allocated a first number of RUs to communicate with the network.

If there is another device that has received access to the network and the other device is associated with the same identifier with which the first device is associated, then the WAP determines how many RUs to allocate to the first device. The WAP compares the identifier and role associated with the first device with information and conditions stored in a database. The database (e.g., a matrix), maintained by the WAP, includes information and conditions related to RU allocation, wherein a device that meets certain criteria (e.g., role, username, MAC address, authentication information, etc.) will be allocated a certain number of RUs. Using the database, the WAP may determine conditions for devices, where the conditions indicate a maximum number of RUs to be allocated to all devices associated with an identifier. The conditions also indicate that the RU allocation for all devices associated with the identifier is based on roles. For example, the first condition indicates a maximum of three RUs to be allocated among all devices associated with the identifier of the first device. The first condition may also indicate that all devices associated with the identifier with a full access role will be allocated at least one RU and more if available, whereas devices with a limited access role will be allocated only one RU. Based on the first condition, the WAP determines that the first device will be allowed one RU to access the network. This is because the access point determines that the other device associated with the identifier has already received two of the three available RUs to access the network. Based on the full access role of the first device and the first condition, the first device is allocated at least one RU and more if available, but no more are available. In some embodiments, the WAP will also determine, based on the condition, that the second device should no longer be allocated two RUs, because the second device has a limited access role. Accordingly, the WAP will change the number of RUs allocated to the second device from two RUs to one RU. With the first device and the second device both using one RU, there is now one RU available to the devices associated with the identifier based on the maximum of three RUs indicated by the first condition. Based on the full access role of the first device and the first condition, the access point can change the number of RUs allocated to the first device from one RU to two RUs because more RUs are now available. In this way the system dynamically updates RU allocation as multiple devices associated with a single identifier are granted access to a WLAN.

Figure 1A:
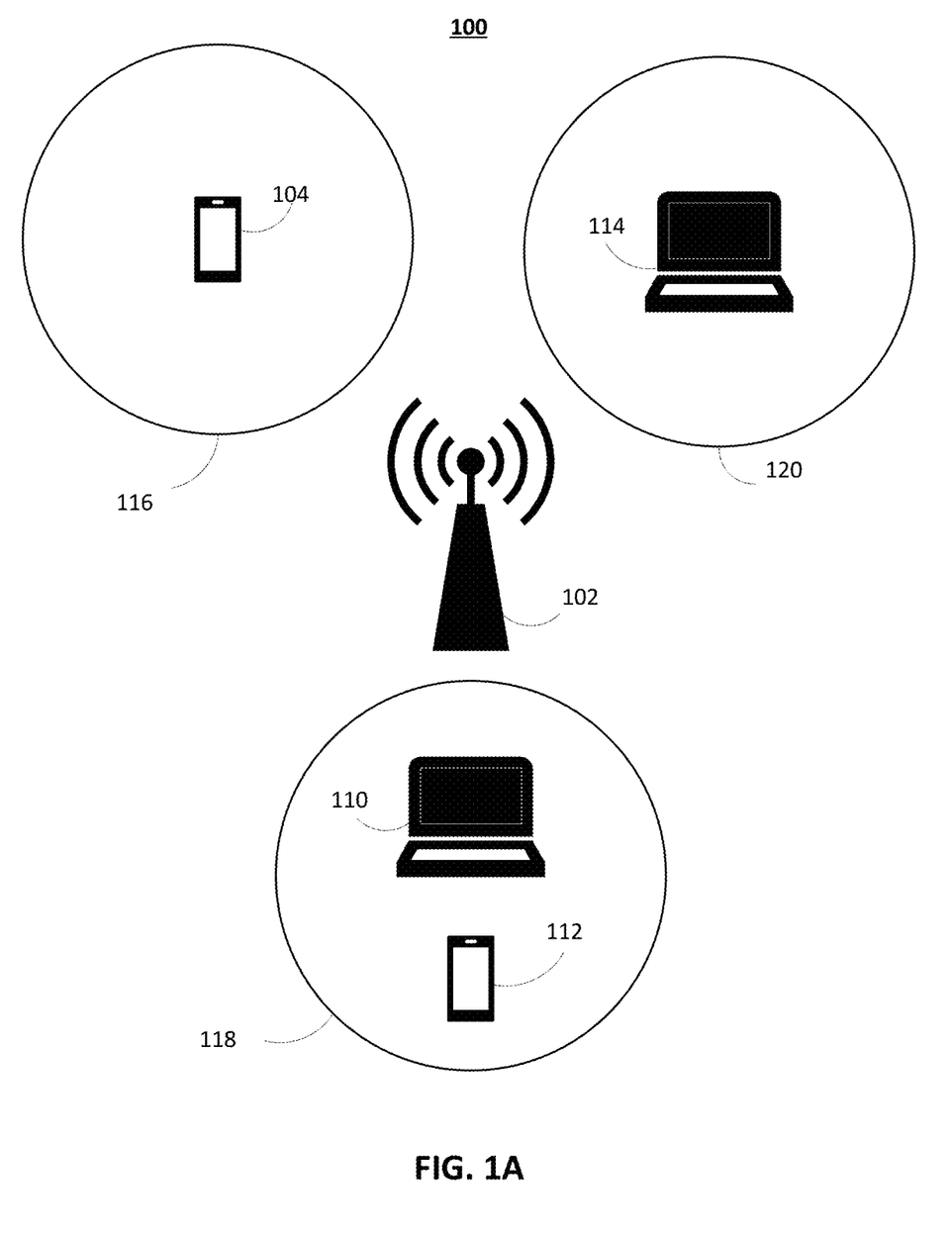
FIG. 1A shows an illustrative network topology of a system for providing a method of user-based resource allocation using OFDMA functionality, in accordance with some embodiments of the disclosure.
Figure 1B:
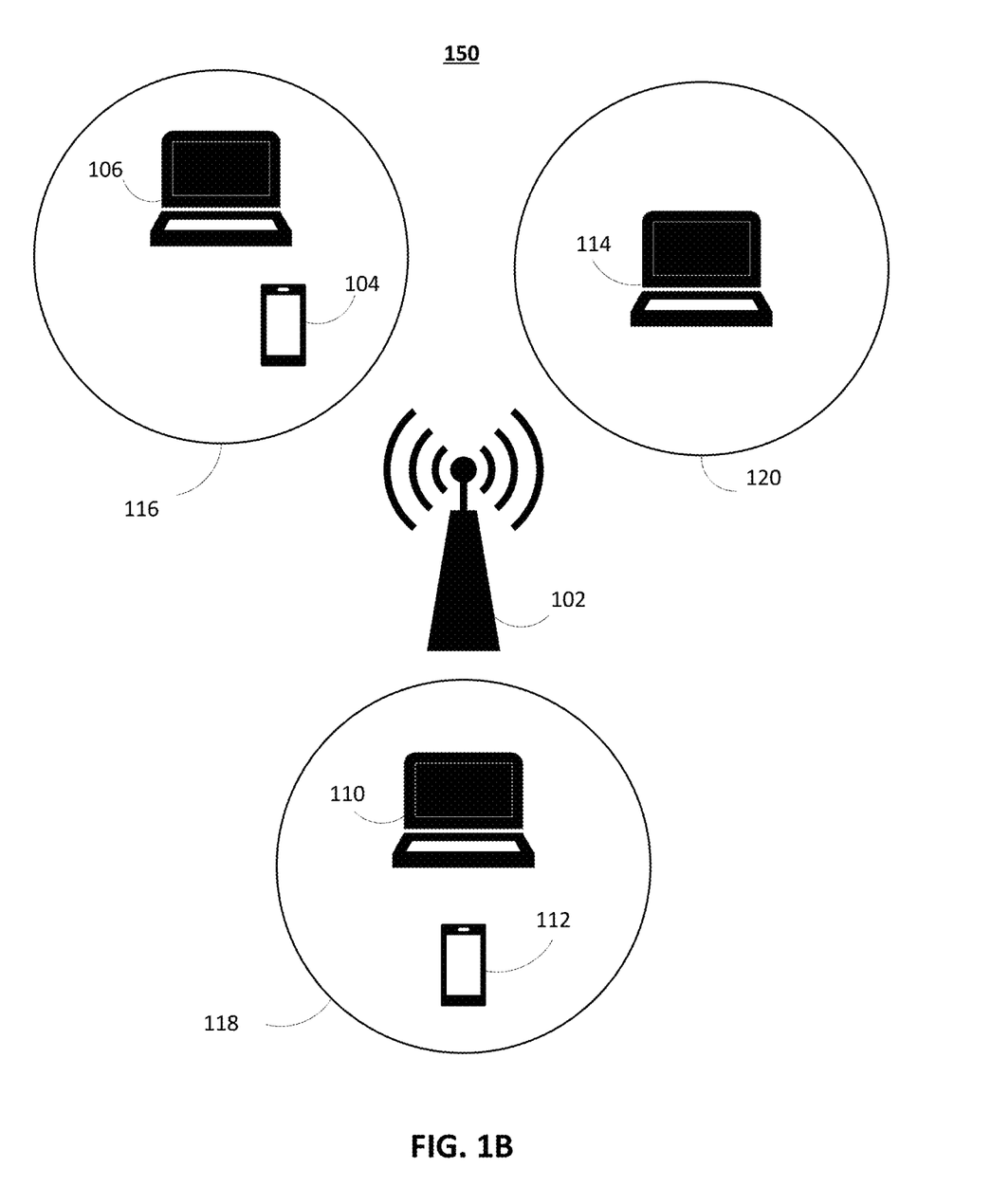
FIG. 1B shows another illustrative network topology of a system for providing a method of user-based resource allocation using OFDMA functionality, in accordance with some embodiments of the disclosure.
Figure 1C:
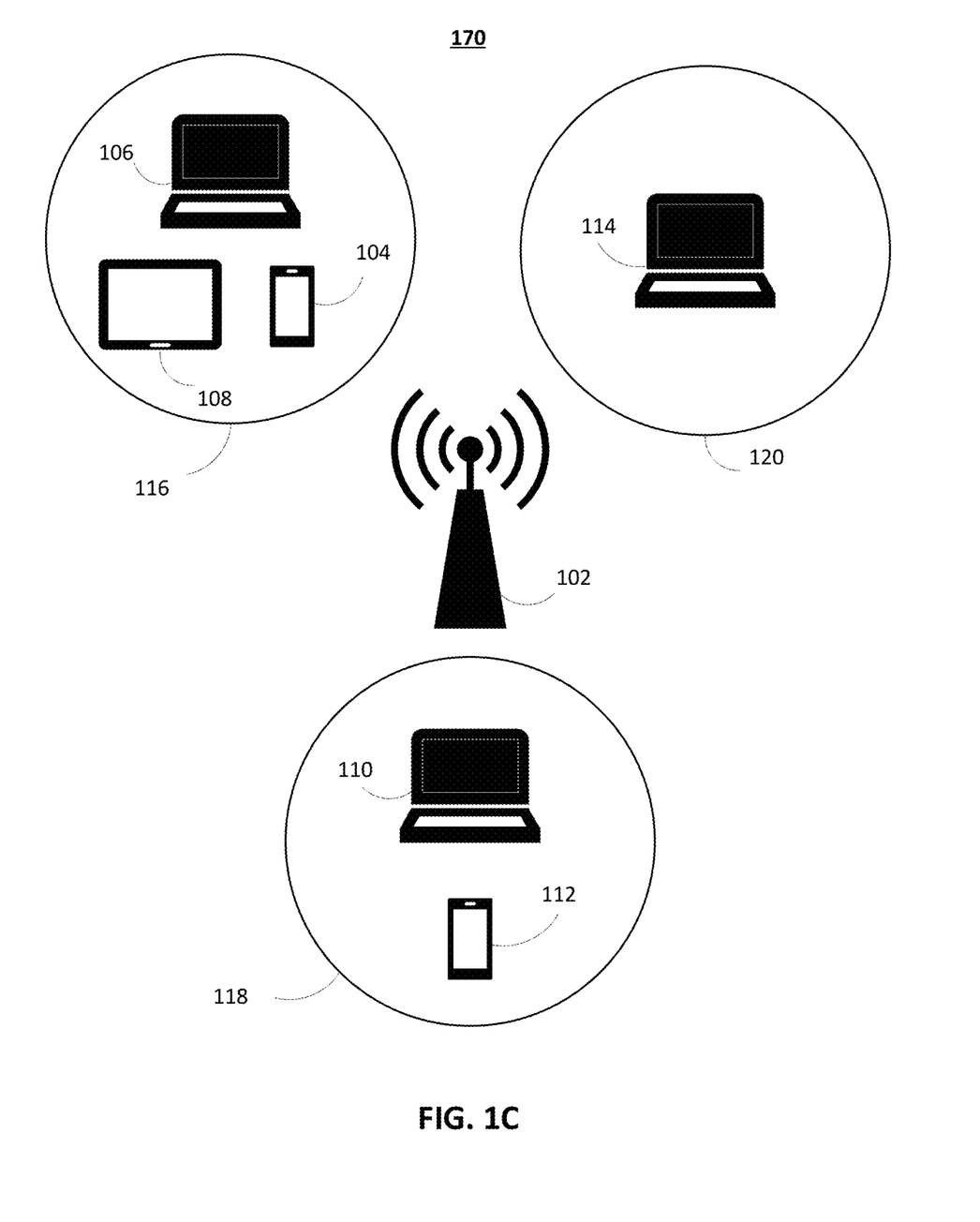
FIG. 1C shows another illustrative network topology of a system for providing a method of user-based resource allocation using OFDMA functionality, in accordance with some embodiments of the disclosure.

FIGS. 1A-C show an illustrative network topology of a system 100 for providing a method of user-based resource allocation using OFDMA functionality. Systems 100, 150, and 170 include a wireless access point (WAP) 102 and user devices (e.g., laptops, tablets, smart phones) 104, 110, 112, and 114. WAP 102 and user devices 104, 106, 108, 110, 112, and 114 are configured to communicate using OFDMA. Although the systems and methods described herein refer specifically to OFDMA, any modulation scheme that allows multiple user devices to access the network by allocating subsets of subcarriers may be used. While user devices and WAPs are described herein, other devices may be used that perform similar functions. In some embodiments, system 100 is a WLAN using a BYOD method.

In FIG. 1A, when a first user wants to access the WLAN with device 104, device 104 will go through a BYOD authentication process. For example, the user inputs credentials that are transmitted to an AAA server using WAP 102. In some embodiments, the credentials can be automatically submitted to the AAA server without a user input. The credentials can comprise any amount of information used to authenticate device 104 (e.g., passwords, hard disk IDs, central processing unit serial numbers, MAC addresses, biometrics, etc.). The AAA server compares the received credentials against valid credentials stored in a database, and, if the credentials match, the device is authenticated. If the submitted credentials vary from the valid credentials, device 104 is not authenticated, and the process ends. In some embodiments, upon unsuccessful authentication, additional credentials will be requested from device 104.

Based on the BYOD authentication of device 104, device 104 will be associated with an identifier. The identifier is based, at least in part, on the credentials used to authenticate device 104. The identifier may be any identifier that can be used to associate device 104 with a user. For example, the identifier may be a username, MAC address, email address, vendor-specific attribute (VSA), digital certificate, session ID, and/or any other similar such information. In system 100, the shown user devices are grouped according to different user groups 116, 118, and 120. The user groups 116, 118, and 120 represent the identifier associated with each device. Device 104 is associated with a first identifier which is associated with user group 116. User group 116 represents all devices connected to the WLAN that are associated with the first user. As shown in FIG. 1A, user group 116 comprises device 104, user group 118 comprises devices 110 and 112, and user group 120 comprises device 114. Although the term "user" is used in a singular sense, user groups 116, 118, and 120, can be associated with any number of users without departing from the systems and methods described herein.

Based on the BYOD authentication of device 104, device 104 will also be associated with a role. The role can be based on whether device 104 is a personal device or an entity-provided device. In some embodiments, the role may indicate the amount of access provided to device 104. For example, a personal device may receive a limited access role, where the personal device is able to access the WLAN only in order to receive internet connectivity, whereas an entity-provided device, may receive a full access role allowing the device unrestricted access to the WLAN. In system 100, device 104 is a non-entity-provided smartphone, so device 104 receives a limited access role.

After device 104 is authenticated and receives an identifier and role from the AAA server, device 104 sends an access request to WAP 102. The access request can include the identifier and role associated with device 104 and can include additional identifying information (e.g., MAC address, authentication information, etc.) related to device 104. In response to the access request from device 104, WAP 102 determines the number of RUs to allocate to device 104 for communicating with the WLAN. To determine the number of RUs, WAP 102 determines if any other devices have received access to the WLAN, where said devices are associated with the same identifier that device 104 is associated with. In FIG. 1A, WAP 102 determines that there are no other devices associated with the identifier of device 104 being allocated RUs for communicating with the WLAN. WAP 102 determines that device 104 is allowed access to the WLAN using the maximum number of RUs allotted to a device because there are no other devices associated with the same identifier as device 104 being allocated RUs. The maximum number of RUs may be a default of system 100. In some embodiments, the maximum number of RUs allotted to a device may be determined based on entries stored in a database. The database (e.g., a matrix) can be maintained by WAP 102 and includes information and conditions related to RU allocation. For example, when a device meets certain criteria (e.g., role, username, MAC address, authentication information, etc.), the device will be allocated a certain number of RUs. In some embodiments, upon receiving an identifier from a device (e.g., device 104), WAP 102 determines that there are one or more entries in the database that specify conditions associated with the identifier. In some embodiments, the number of devices associated with the same identifier being allocated RUs determines the condition to be applied. For example, a first entry may have a condition associated with the identifier of device 104 that indicates that when no other devices associated with said identifier are being allocated resources, then the maximum number of RUs should be allocated to device 104. The entry may have another condition that indicates that the maximum number of RUs per device is two RUs. In accordance with the conditions of the first entry, device 104 is allocated two RUs.

FIG. 1B shows an illustrative diagram of system 150 for providing a method of user-based resource allocation using OFDMA functionality for devices 104, 106, 110, 112, and 114. System 150 may have the same devices and links as shown in system 100 except for the addition of device 106.

In some embodiments, the first user may want to access the WLAN with a second device 106. Device 106 goes through the BYOD authentication process as described above and receives an identifier and role from the AAA server. The identifier associated with device 106 identifies device 106 as being associated with the same user group (user group 116) as device 104. In some embodiments, device 106 is an entity-provided laptop, so device 106 receives a full access role. Device 106 sends an access request to WAP 102, where the access request includes the identifier and role associated with device 106. In some embodiments, the access request can include additional identifying information related to device 106. In response to the access request from device 106, WAP 102 determines the number of RUs to allocate to device 106 for communicating with the WLAN. WAP 102 determines whether there are any other devices that have received access to the WLAN and are associated with the same identifier as device 106. WAP 102 can determine that device 104 is associated with the same identifier as device 106, illustrated by both device 104 and device 106 being in user group 116. WAP 102 can make this determination based on checking which devices are currently being allocated RUs. In some embodiments, WAP 102 stores information related to all devices being allocated RUs in a database. In some embodiments, the database that stores information related to what devices are being allocated RUs is the same database that stores the entries that specify conditions associated with identifiers.

In response to determining that there is another device (device 104) associated with the same identifier as device 106, WAP 102 compares the identifier and role associated with device 106 with information and conditions stored in the database. WAP 102 determines that there are one or more entries in the database that specify conditions associated with the identifier of device 106. In some embodiments, an entry associated with the identifier of device 106 indicates conditions based on the number of devices associated with the identifier of device 106 being allocated RUs. The entry can have a first condition that indicates a maximum of three RUs to be allocated among all devices associated with the identifier. The entry can have a second condition that indicates that all devices associated with the identifier of device 106 with a full access role will be allocated at least one RU and more if available, whereas devices with a limited access role will be allocated only one RU. Based on the entry, WAP 102 allocates device 106 one RU to access the WLAN. This is because WAP 102 determines that device 104 (which is associated with the same identifier as device 106) has already received two of the three available RUs to access the WLAN. Based on the full access role of device 106 and the entry, device 106 is allocated at least one RU and more if available. Because only one RU is available, WAP 102 will allocate one RU to device 106.

In some embodiments, WAP 102 can also determine, based on the entry, that device 104 should no longer be allocated two RUs because device 104 has a limited access role. Accordingly, WAP 102 changes the number of RUs allocated to device 104 from two RUs to one RU. The change in the number of RUs being allocated to device 104 means device 104 and device 106 are both using one RU. This causes the total number of RUs being used by user group 116 to be two RUs. With only two of the maximum three RUs being allocated, WAP 102 can allocate one more RU to user group 116 in accordance with the first condition of the entry. Based on the full access role of device 106 and the second condition, WAP 102 can change the number of RUs allocated to device 106 from one RU to two RUs because more RUs are now available. In this way, the system dynamically updates RU allocation as multiple devices associated with a single identifier are granted access to the WLAN. In some embodiments, WAP 102 can change the number of RUs allocated to device 104 from two RUs to one RU before allocating two RUs to device 106. In some embodiments, WAP 102 can first allocate device 106 two RUs, then change the number of RUs allocated to device 104 from two RUs to one RU. In some embodiments, the allocations and updating of allocations of RUs to devices can be performed in any order or can happen simultaneously.

FIG. 1C shows an illustrative diagram of system 170 for providing a method of user-based resource allocation using OFDMA functionality for devices 104, 106, 108, 110, 112, and 114. System 170 may have the same devices and links as shown in system 150, except for the addition of device 108.

In some embodiments, the same user may want to access the WLAN with a third device 108. Device 108 goes through the BYOD authentication process as described above and receives an identifier and role from the AAA server. The identifier associated with device 108 identifies device 108 as being associated with the same user group (user group 116) as devices 104 and 106. In some embodiments, device 108 is a non-entity-provided tablet, so device 108 receives a limited access role. Device 108 sends an access request to WAP 102, where the access request includes the identifier and role associated with device 108. In some embodiments, the access request can include additional identifying information related to device 108. In response to the access request from device 108, WAP 102 determines a number of RUs to allocate to device 108 for communicating with the WLAN. WAP 102 determines whether there are any other devices that have received access to the WLAN, where said devices are associated with the same identifier as device 108. WAP 102 determines that devices 104 and 106 have been allocated RUs and are both associated with the same identifier as device 108 as illustrated by the devices (104, 106, and 108) in user group 116.

WAP 102 compares the identifier and role associated with device 108 with information and conditions stored in the database. WAP 102 can determine that there are one or more entries in the database that specify conditions associated with the identifier of device 108. The entry, discussed above, is associated with the identifier of device 108 and indicates conditions based on the number of devices associated with the identifier of device 108 being allocated RUs. As mentioned, the entry may have a first condition that indicates a maximum of three RUs to be allocated among all devices associated with the identifier. The entry may also have a second condition that indicates that all devices associated with the identifier of user group 116 with a full access role will be allocated at least one RU and more if available, and devices with a limited access role will be allocated only one RU. The WAP 102 determines that device 104 has been allocated one RU and device 106 has been allocated two RUs to communicate with the WLAN. Accordingly, three of the maximum three RUs have been allocated to devices associated with the identifier of device 108. In some embodiments, WAP 102 allocates one RU to device 108 and changes the number of RUs allocated to device 106 from two RUs to one RU, because with the addition of device 108 there are no longer two RUs available for device 106. In some embodiments, the user is notified that the user is not able to access the WLAN with any additional devices. In some embodiments, the database is updated according to the total number of devices connected to the WLAN. For example, when there are a limited number of devices (e.g., thirty devices) accessing the WLAN, an entry in the database may indicate that the maximum number of RUs available to user group 116 may be increased. In some embodiments, a Change in Authorization (CoA) or disconnect can be done when users are using more RUs than needed. For example, in an embodiment, entries in the database may result in each device (104, 106, and 108) of user group 116 being allocated two RUs each to access the WLAN. A CoA can be performed to change the total number of RUs being allocated to user group 116 causing each device (104, 106, and 108) to be allocated only one RU. In some embodiments, the CoA can result in the change of RU allocation on a per device and/or per user basis. Additionally, the CoA may be temporary or permanent. In some embodiments, the CoA lasts for a limited period of time (e.g., an hour, a day, etc.). In some embodiments, the CoA lasts until a number of devices or users, attempting to access the WLAN, exceeds a certain threshold. In some embodiments, a first CoA last until a new second CoA is generated.

Figure 2:
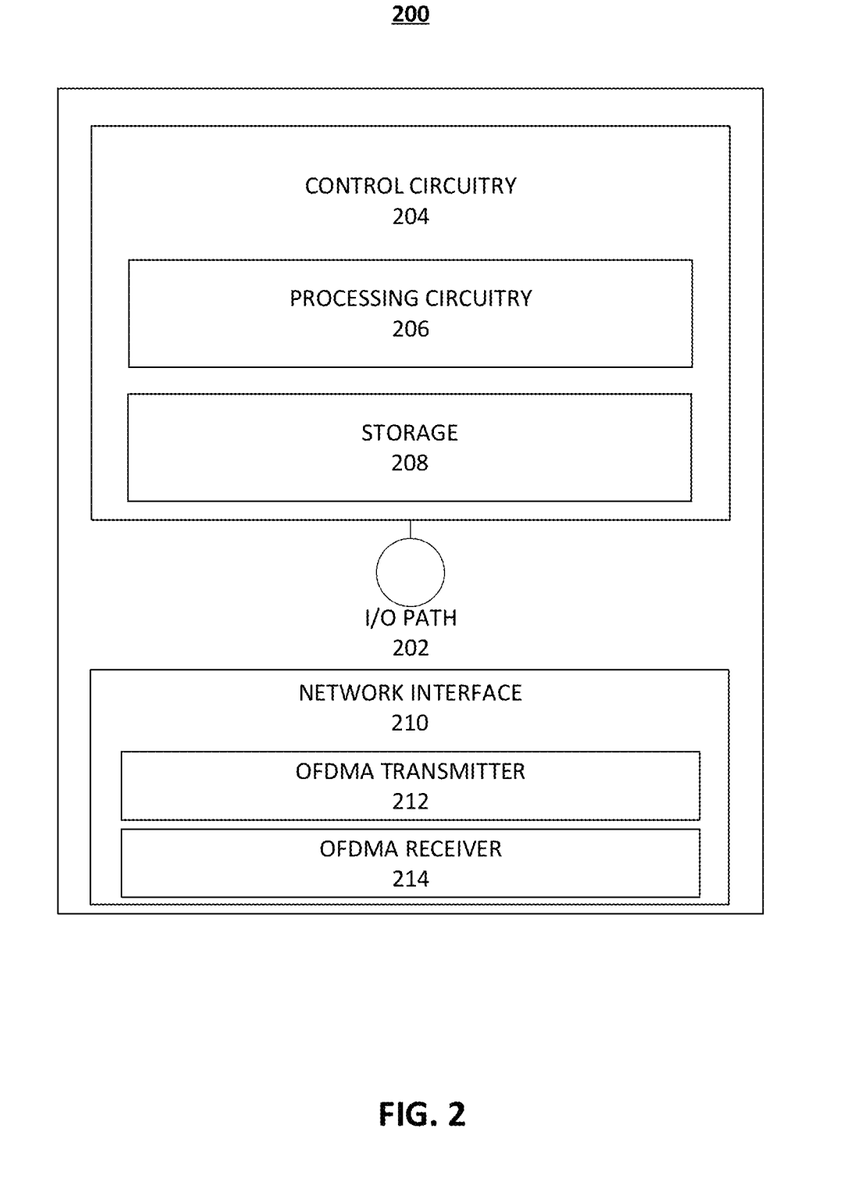
FIG. 2 shows an illustrative device for providing a method of user-based resource allocation using OFDMA functionality, in accordance with some embodiments of the disclosure.

FIG. 2 shows an illustrative device for providing a method of user-based resource allocation using OFDMA functionality, in accordance with some embodiments of the disclosure. In particular, device 200 of FIG. 2 may be the WAP 102 depicted in FIGS. 1A-C. Device 200 may receive data via data network interface 210 and provide the received data to control circuitry 204 via an input/output (I/O) path 202. In some embodiments, the network interface 210 may receive data using an OFDMA receiver 214. OFDMA receiver 214 can receive data to one or more user devices (e.g., 104, 106, 108, 110, 112, and/or 114) over a wireless transmission medium. In some embodiments, the OFDMA receiver 214 picks up a signal which is then quadrature-mixed down to a baseband using cosine and sine waves. The baseband signals can then be sampled and digitized using analog to digital converters. In some embodiments, a forward fast Fourier transform (FFT) is used to convert the signals to the frequency domain. The resulting parallel streams can be recombined into a serial stream.

In some embodiments, the network interface 210 may transmit data using an OFDMA transmitter 212. OFDMA transmitter 212 can transmit data to one or more user devices (e.g., 104, 106, 108, 110, 112, and/or 114) over a wireless transmission medium. In some embodiments, the OFDMA transmitter 212 transmits a signal that is the sum of a number of orthogonal subcarriers, with baseband data on each subcarrier being independently modulated. In some embodiments, the modulation is done using quadrature amplitude modulation (QAM) or phase-shift keying (PSK). When sending and receiving data, device 200 may use OFDMA functionality or any other modulation scheme that allows allocation of subsets of subcarriers. In some embodiments, data is transmitted in accordance with a wireless communication standard such as the IEEE 802.11 family of protocols, but other wireless communication standards and/or protocols may be used. In some embodiments, the OFDMA transmitter 212 and OFDMA receiver 214 may be combined into an OFDMA transceiver. In some embodiments, device 200 is operatively connected to a network.

Control circuitry 204 includes processing circuitry 206 and storage 208. Storage 208 may include volatile memory (such as random-access memory (RAM), for example, static RAM and/or dynamic RAM), which does not retain its contents when power is turned off, and non-volatile memory (such as, for example, a solid state drive (SSD), a hard disk drive (HDD), electrically erasable programmable read-only memory (EEPROM), etc.), which does retain its contents when power is turned off. Control circuitry 204 may send and receive commands, requests, and other suitable data using I/O path 202. As noted above, I/O path 202 connects control circuitry 204 (and specifically processing circuitry 206) to network interface 210, which in turn connects device 200 to one or more other devices.

Control circuitry 204 may be based on any suitable processing circuitry, such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 204 executes instructions suitable to implement any of the techniques described above or below.

Storage 208 may be an electronic storage device that is part of control circuitry 204. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, storage 208 may include a database (e.g., a matrix) that comprises entries that provide information and conditions related to RU allocation. For example, if a user device meets certain criteria (e.g., role, username, MAC address, authentication information, etc.), the user device will be allocated a certain number of RUs. The database may also contain status information of all devices being allocated RUs to communicate with the network. Multiple circuits may be provided to handle simultaneous processing functions.

Figure 3A:
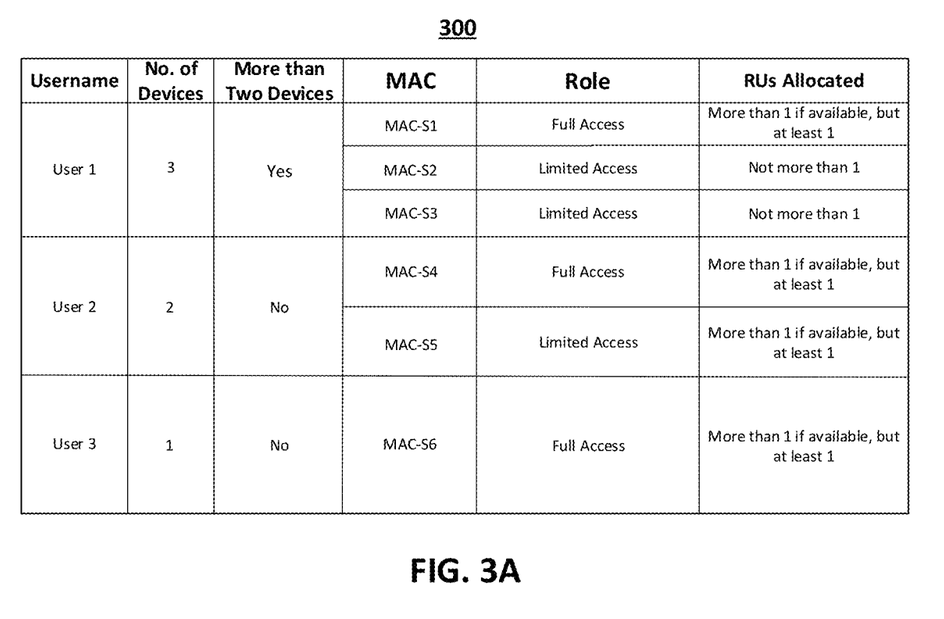
FIG. 3A shows another diagram of an illustrative table for providing a method of user-based resource allocation using OFDMA functionality, in accordance with some embodiments of the disclosure.

FIG. 3A shows a diagram of an illustrative table 300 for providing a method of user-based resource allocation using OFDMA functionality, in accordance with some embodiments of the disclosure. In particular, table 300 can illustrate a table of entries contained in the database maintained by WAP 102. In some embodiments, table 300 reflects system 170 from FIG. 1C.

Table 300 includes three entries corresponding to three different usernames (User 1, User 2, and User 3) where each username is associated with a different user. As shown, usernames are used as identifiers for the entries, but similar such identifiers can be used. Table 300 includes additional information for each entry. For each username, table 300 indicates the number of devices associated with the username that are being allocated one or more RUs for communicating with the WLAN. For example, table 300 shows three devices associated with username "User 1." Table 300 also displays two devices associated with User 2 being allocated one or more RUs for communicating with the WLAN. Table 300 also displays only one device associated with User 3 being allocated one or more RUs for communicating with the WLAN. For each username, table 300 also indicates whether there are two or more devices being allocated one or more RUs for communicating with the WLAN. In some embodiments, table 300 indicates the "More than Two Devices" column due to a requirement of the one or more conditions stored in the database maintained by the WAP. For example, a first condition applies when there are two or fewer devices, associated with the same identifier (username), being allocated one or more RUs, and a second condition applies when more than two devices associated with the same identifier are allocated one or more RUs. The first condition specifies that devices associated with the same identifier are allocated more than one RU if available, but at least one. The second condition specifies that devices associated with the same identifier are allocated different numbers of RUs based on the role of the device. In some embodiments, different conditions are used where the different conditions are based on any number of devices associated with the same identifier.

As shown, each username entry has subentries according to the devices associated with the username that are being allocated one or more RUs. For example, User 1 has three subentries corresponding to the three devices that are associated with User 1 and are being allocated one or more RUs. User 2 has two subentries because there are two devices that are associated with User 2 that are being allocated one or more RUs. User 3 has only one entry because there is only one device that is associated with User 3 that is being allocated one or more RUs.

Table 300 includes additional information in each subentry. For each device, the corresponding MAC address or other device identifier is stored in table 300. The role associated with each device is also stored in table 300. In some embodiments, the role is based on whether the device is a personal device or an entity-provided device. For example, a personal device (e.g., the device with the MAC-S2 address) may receive a limited access role, while a device (e.g., the device with the MAC-S1 address), provided by the entity supporting the WLAN, may receive a full access role. For each device, the conditions related to each device's RU allocation can be indicated in the column "RUs Allocated" or this information may be stored in a separate table, for example FIG. 3B below. In some embodiments, the role associated with the device can determine the number of RUs allocated to the device. For example, a first condition applies to devices MAC-S1, MAC-S2, and MAC-S3, because there are more than two devices associated with the same username (User 1). In some embodiments, the first condition further indicates that devices with a full access role will be allocated more than one RU if available, but at least one RU, and devices with a limited access role will be allocated not more than one RU. Accordingly, the first condition is applied to the allocation of RUs to the devices. For example, because device MAC-S1 has a full access role, it will be allocated more than one RU if available, but at least one RU. Devices MAC-S2, and MAC-S3 will be allocated not more than one RU, because they have a limited access role. A second condition applies to devices MAC-S4, MAC-S5, and MAC-S6, because there are not more than two devices associated with the same username. For example, only two devices (devices MAC-S4 and MAC-S5) are associated with User 2, and only one device (device MAC-S6) is associated with User 3. As shown, devices MAC-S4, MAC-S5, and MAC-S6 are all allocated more than one RU if available, but at least one regardless of role, as indicated by the second condition. In some embodiments, the available RUs may be determined by conditions stored in the database maintained by the WAP. In some embodiments, the available RUs are identifier (e.g., username)-specific. In some embodiments, the available RUs are based on the total number of devices connected to the WLAN or similar such information. Table 300 is just one embodiment used to display an illustrative table for providing a method of user-based resource allocation using OFDMA functionality; similar storage formats, methods, and information can be used. For example, additional information or less information may be stored in table 300.

Figure 3B:
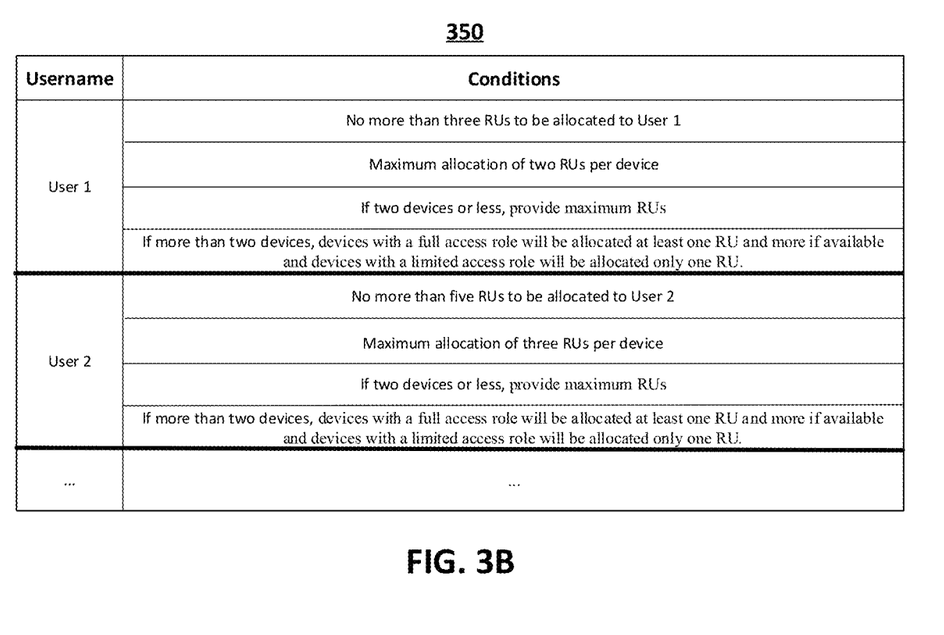
FIG. 3B shows another diagram of an illustrative table for providing a method of user-based resource allocation using OFDMA functionality, in accordance with some embodiments of the disclosure.

FIG. 3B shows a diagram of an illustrative table 350 for providing a method of user-based resource allocation using OFDMA functionality, in accordance with some embodiments of the disclosure. In particular, table 350 can illustrate a table of entries contained in the database maintained by WAP 102. In some embodiments, table 350 reflects entries and conditions used in a WLAN.

Table 350 shows two entries corresponding to two different usernames (User 1 and User 2), where each username is associated with a different user. Although only two entries are shown, any number of entries can be included in table 350. As shown, usernames are used as identifiers for the entries, but similar such identifiers can be used. Table 350 includes conditions associated with each entry, where the conditions are applied when allocating RUs to devices associated with an entry. For example, the conditions of entry one will apply to a first device with an identifier of User 1, and the conditions of entry two will apply to a second device with an identifier of User 2. The first condition associated with the first entry indicates that no more than three RUs are to be allocated to User 1. In accordance with the first condition, the total number of RUs that can be allocated among all devices associated with User 1 is three RUs. The second condition associated with the first entry indicates that each device associated with User 1 is allowed a maximum allocation of two RUs. In accordance with the second condition, a device associated with the first entry can be allocated a maximum of only two RUs. The third condition associated with the first entry indicates that if there are two devices or less, the maximum number of RUs may be provided to each device. The fourth condition associated with the first entry indicates that if there are more than two devices, devices with a full access role will be allocated at least one RU and more if available, and devices with a limited access role will be allocated only one RU.

In some embodiments, the WAP, using control circuitry (e.g., control circuitry 204), applies all the conditions associated with an entry to a device, where the entry corresponds to the identifier of said device. In some embodiments, table 350 is updated according to the total number of devices connected to a WLAN. For example, when there are a limited number of devices (e.g., thirty devices) accessing the WLAN, the first condition of the first entry may be updated to indicate that the maximum number of RUs available to User 1 may be increased. In some embodiments, a Change of Authorization (CoA) or disconnect can be performed, for example, when a user is using more RUs than needed. In an embodiment, a CoA may be used to change the second condition of the second entry from a maximum allocation of three RUs per device to a maximum of two RUs per device.

Figure 4:
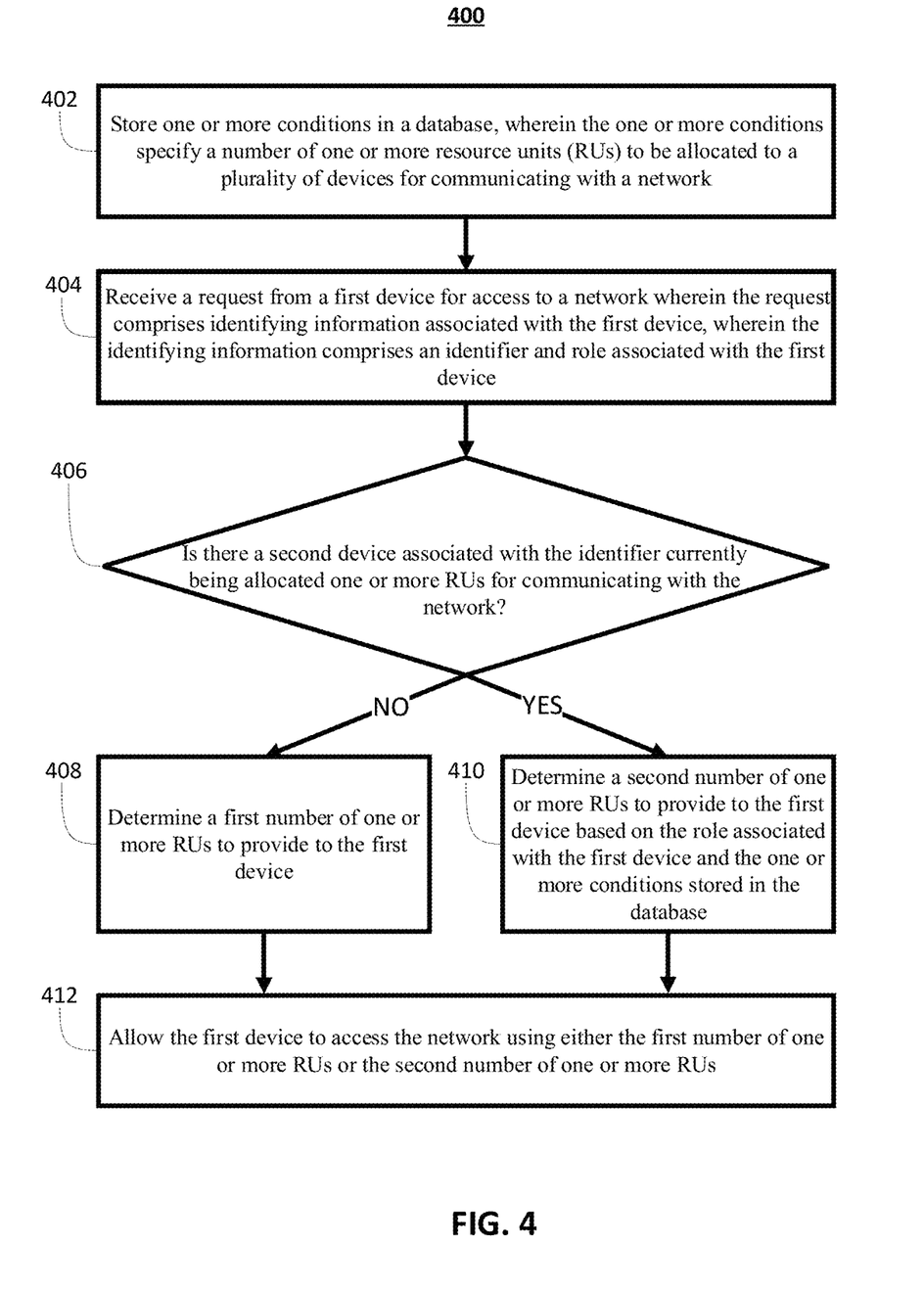
FIG. 4 is a flowchart of an illustrative process for providing a method of user-based resource allocation using OFDMA functionality, in accordance with some embodiments of the present disclosure.

FIG. 4 shows a flowchart of an illustrative process for providing a method of user-based resource allocation using OFDMA functionality, in accordance with some embodiments of the present disclosure. Process 400 may be performed by physical or virtual control circuitry, such as control circuitry 204 of device 200 (FIG. 2). For example, process 400 may be performed by control circuitries of WAP 102. In some embodiments, some steps of process 400 may be performed by one of several devices. For example, WAP 102 may be connected to a server that performs steps of process 400.

At step 402, control circuitry stores one or more conditions in a database, wherein the one or more conditions specify a number of one or more RUs to be allocated to a plurality of devices for communicating with a network. In some embodiments, the database is stored in storage 208 of device 200 (FIG. 2) and is maintained by device 200. The database can include information and conditions related to RU allocation. For example, when a device meets certain criteria (e.g., role, username, MAC address, authentication information, etc.), the device will be allocated a certain number of RUs. In some embodiments, the conditions are preconfigured into the database. In some embodiments, the conditions are inputted by a user, such as a network administrator.

At step 404, control circuitry receives a request from a first device for access to a network, wherein the request comprises identifying information associated with the first device. In some embodiments, the request is received by an OFDMA receiver (e.g., OFDMA receiver 214 of device 200) and processed using control circuitry (e.g., control circuitry 204 of device 200). In some embodiments, the identifying information comprises an identifier and role associated with the first device. The identifier can be associated with the credentials (e.g., identification number, password, etc.) used to authenticate the first device. The identifier can be any identifier that can be used to associate the first device with a user or users. For example, the identifier may be a username, MAC address, email address, vendor-specific attribute (VSA), digital certificate, session ID, and/or any other similar such information. The role can be based on whether the device is a personal device or an entity-provided device. For example, a personal device may receive a limited access role, whereas a device provided by the entity supporting the WLAN may receive a full access role.

At step 406, control circuitry determines whether there are any other devices associated with the same identifier as the first device currently being allocated one or more RUs for communicating with the network. The control circuitry can make this determination based on stored information relating to all devices that are being allocated one or more RUs for communicating with the network. For example, the control circuitry may use a table (e.g., table 300) stored in storage (e.g., storage 208 of device 200) to determine which devices are allocated one or more RUs. In some embodiments, the control circuitry queries the system to determine whether there are any other devices associated with the same identifier as the first device being allocated one or more RUs for communicating with the network. If the control circuitry determines that there are not any other devices associated with the same identifier as the first device currently being allocated one or more RUs for communicating with the network, then the process 400 continues to step 408. If the control circuitry determines that there is another device associated with the same identifier as the first device being allocated one or more RUs for communicating with the network, then the process 400 continues to step 410.

At step 408, control circuitry determines a first number of one or more RUs to provide to the first device. In some embodiments, the first number of one or more RUs is based on a first condition where the condition is stored in a table (e.g., table 350) located in the database in storage (e.g., storage 208 of device 200). The first condition applies to instances when there is only one device associated with an identifier being allocated one or more RUs. In some embodiments, the first condition is that the device is allocated more than one RU if available, but at least one. Based on the first condition, the control circuitry will determine that the first number of one or more RUs will be more than one RU if available, but at least one. In some embodiments, the available RUs may be determined by the first condition or other conditions stored in the storage (e.g., storage 208 of device 200) maintained by the WAP. In some embodiments, the available RUs are identifier specific. In some embodiments, the available RUs are based on the total number of devices connected to the WLAN or similar such information.

At step 410, control circuitry determines a second number of one or more RUs to provide to the first device based on the role associated with the first device and the one or more conditions stored in a table (e.g., table 350) located in the database in storage (e.g., storage 208 of device 200). In some embodiments, the second number of one or more RUs is based on the role associated with the first device and the one or more conditions stored in the table (e.g., table 350) located in the database. In some embodiments, a second condition applies to instances when there is more than one device associated with the same identifier being allocated one or more RUs. The second condition further indicates that devices with a full access role will be allocated more than one RU if available, but at least one RU, whereas devices with a limited access role will be allocated not more than one RU. Based on the second condition and the role of the first device, the control circuitry determines a second number of one or more RUs to provide to the first device. For example, if the first device has a full access role, the control circuitry will determine that the second number of one or more RUs will be more than one RU if available, but at least one RU. If the first device has a limited access role, the control circuitry will determine that the second number of one or more RUs will not be more than one RU. As discussed above, the available RUs may be determined by the second condition or other conditions stored in storage (e.g., storage 208 of device 200) maintained by the WAP. In some embodiments, the available RUs are identifier and/or device specific. In some embodiments, the available RUs are based on the total number of devices connected to the WLAN or similar such information.

At step 412, control circuitry allows the first device to access the network using either the first number of one or more RUs or the second number of one or more RUs. If there are not any other devices associated with the same identifier as the first device currently being allocated one or more RUs for communicating with the network, then the WAP will allow the first device to access the network using the first number of one or more RUs. If there are any other devices associated with the same identifier as the first device currently being allocated one or more RUs for communicating with the network, then the WAP will allow the first device to access the network using the second number of one or more RUs. In some embodiments, the WAP updates a table (e.g., table 300) located in the database to reflect that the first device has been allocated either the first or second number of one or more RUs. In some embodiments, the table can be updated periodically and/or in response to one or more devices being allocated RUs. In some embodiments, the table can be updated in response to a change in the number of RUs being allocated to one or more devices and/or one or more devices no longer being allocated RUs (e.g., a device disconnecting from the network).

Figure 5:
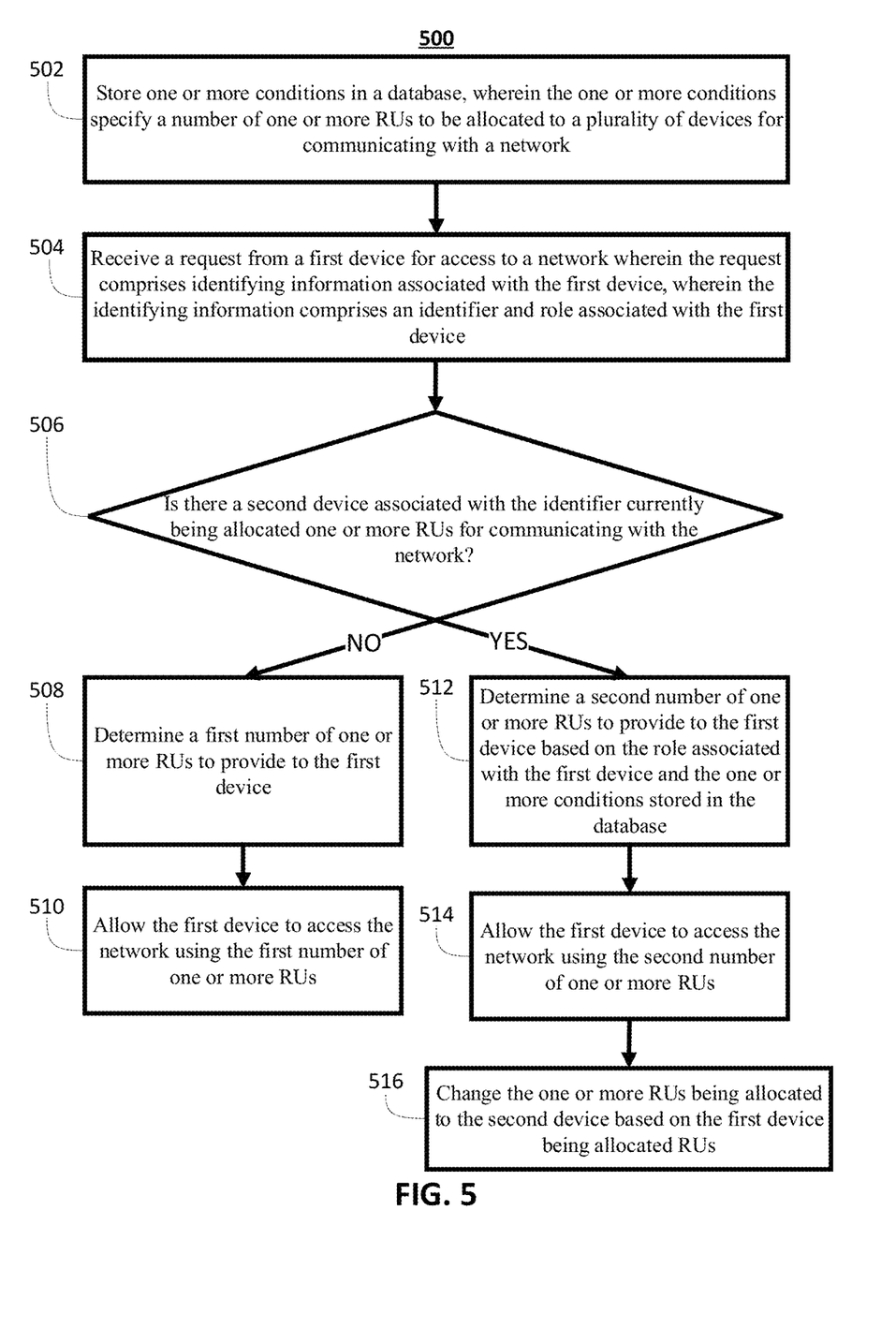
FIG. 5 is another flowchart of an illustrative process for providing a method of user-based resource allocation using OFDMA functionality, in accordance with some embodiments of the present disclosure.

FIG. 5 shows a flowchart of an illustrative process for providing a method of user-based resource allocation using OFDMA functionality, in accordance with some embodiments of the present disclosure. Process 500 may be performed by physical or virtual control circuitry, such as control circuitry 204 of device 200 (FIG. 2). For example, process 500 may be performed by control circuitries of WAP 102. In some embodiments, some steps of process 500 may be performed by one of several devices. For example, WAP 102 may be connected to a server that performs steps of process 500.

At step 502, control circuitry stores one or more conditions in a database, wherein the one or more conditions specify a number of one or more RUs to be allocated to a plurality of devices for communicating with a network. In some embodiments, the database is stored in storage 208 of device 200 (FIG. 2) and is maintained by device 200. In some embodiments, the database can include information and conditions related to RU allocation.

At step 504, control circuitry, receives a request from a first device for access to a network, wherein the request comprises identifying information associated with the first device. In some embodiments, the request is received by an OFDMA receiver (e.g., OFDMA receiver 214 of device 200) and processed using control circuitry (e.g., control circuitry 204 of device 200). In some embodiments, the identifying information comprises an identifier and role associated with the first device. The identifier may be any identifier that can be used to associate the first device with a user or users. For example, the identifier may be a username, MAC address, email address, vendor-specific attribute (VSA), digital certificate, session ID, and/or any other similar such information. The role can be based on whether the device is a personal device or an entity-provided device. For example, a personal device may receive a limited access role, whereas a device provided by the entity supporting the WLAN may receive a full access role.

At step 506, control circuitry determines whether there are any other devices, associated with the same identifier as the first device, being allocated one or more RUs for communicating with the network. The control circuitry can make this determination based on stored information relating to all devices that are being allocated one or more RUs for communicating with the network. For example, the control circuitry may use a table (e.g., table 300) stored in storage (e.g., storage 208 of device 200) to determine which devices are allocated one or more RUs. In some embodiments, the control circuitry queries the system to determine if there are any other devices, associated with the same identifier as the first device, being allocated one or more RUs for communicating with the network. If the control circuitry determines that there are not any other devices associated with the same identifier as the first device currently being allocated one or more RUs for communicating with the network, then the process 500 continues to step 508. If the control circuitry determines that there is a second device associated with the same identifier as the first device being allocated one or more RUs for communicating with the network, then the process 500 continues to step 512.

At step 508, control circuitry determines a first number of one or more RUs to provide to the first device. In some embodiments, the first number of one or more RUs is based on a first condition where the condition is stored in a table (e.g., table 350) located in storage (e.g., storage 208 of device 200). The first condition applies to instances when there is only one device associated with the same identifier being allocated one or more RUs. In some embodiments, the first condition is that the device is allocated more than one RU if available, but at least one. Based on the first condition, the control circuitry will determine that the first number of one or more RUs will be more than one RU if available, but at least one. In some embodiments, the available RUs may be determined by the first condition or other conditions stored in the storage (e.g., storage 208 of device 200) maintained by the WAP. In some embodiments, the available RUs are identifier- and/or device-specific. In some embodiments, the available RUs are based on the total number of devices connected to the WLAN or similar such information. At step 510, control circuitry, allows the first device to access the network using the first number of one or more RUs determined in step 508.

At step 512, control circuitry determines a second number of one or more RUs to provide to the first device based on the role associated with the first device and the one or more conditions stored in the database. In some embodiments, the second number of one or more RUs is based on the role associated with the first device and a second condition where the condition is stored in a table (e.g., table 350) located in storage (e.g., storage 208 of device 200). In some embodiments, a second condition applies to instances when there is more than one device associated with the same identifier being allocated one or more RUs. The second condition further indicates that devices with a full access role will be allocated more than one RU if available, but at least one RU, whereas devices with a limited access role will be allocated not more than one RU. Based on the second condition and the role of the first device the control circuitry, determines a second number of one or more RUs to provide to the first device. For example, because the first device has a full access role, the control circuitry will determine that the second number of one or more resource unit will be more than one RU if available, but at least one RU. As discussed above, the available RUs may be determined by the second condition or other conditions stored in the database maintained by the WAP. In some embodiments, the available RUs are identifier- and/or device-specific. In some embodiments, the available RUs are based on the total number of devices connected to the WLAN or similar such information. At step 514, control circuitry, allows the first device to access the network using the second number of one or more RUs determined in step 512. In some embodiments, the WAP updates a table (e.g., table 300) located in the database to reflect that the first device has been allocated the second number of one or more RUs.

At step 516, control circuitry changes the one or more RUs being allocated to the second device based on the first device being allocated resource units. After updating a table (e.g., table 300) to indicate that the first device has been allocated the second number of one or more RUs, the control circuitry can determine that number of RUs being allocated to the second device should change. In some embodiments, the control circuitry uses one or more tables (e.g., tables 300 and 350), to change the number of RUs being allocated to the second device. For example, the second condition can further indicate that the maximum number of RUs allocated to all devices associated with an identifier is three RUs. In this example, the second device is allocated two RUs as the first device goes through process 500. At step 512, control circuitry can determine that two of the maximum three RUs are already allocated to the second device. The control circuitry can determine that the second number of RUs to provide to the first device is one RU, because the first device has a full access role and is to be allocated more than one RU if available, but at least one RU. Because only one RU is available, control circuitry will determine that the second number of one or more RUs is one RU. In some embodiments, at step 516, control circuitry determines, based on the second condition, that the second device should no longer be allocated two RUs because the second device has a limited access role. Accordingly, the control circuitry can be configured to change the number of RUs allocated to the second device from two RUs to one RU. The change in the number of RUs being allocated to the second device means the first device and the second device are both using one RU, causing the total number of RUs allocated to the two devices to be two RUs. With only two of the maximum three RUs being allocated, in accordance with the second condition, control circuitry can be configured to allocate one more RU to either the first or second device. Based on the full access role of the first device and the second condition, the control circuitry can be configured to change the number of RUs allocated to the first device from one RU to two RUs because more RUs are available. In this way, the system dynamically updates RU allocation as multiple devices associated with the same identifier are granted access to a WLAN. In some embodiments, control circuitry is configured to change the number of RUs allocated to the second device from two RUs to one RU before determining the second number of one or more RUs to provide to the first device at step 512.

Figure 6:
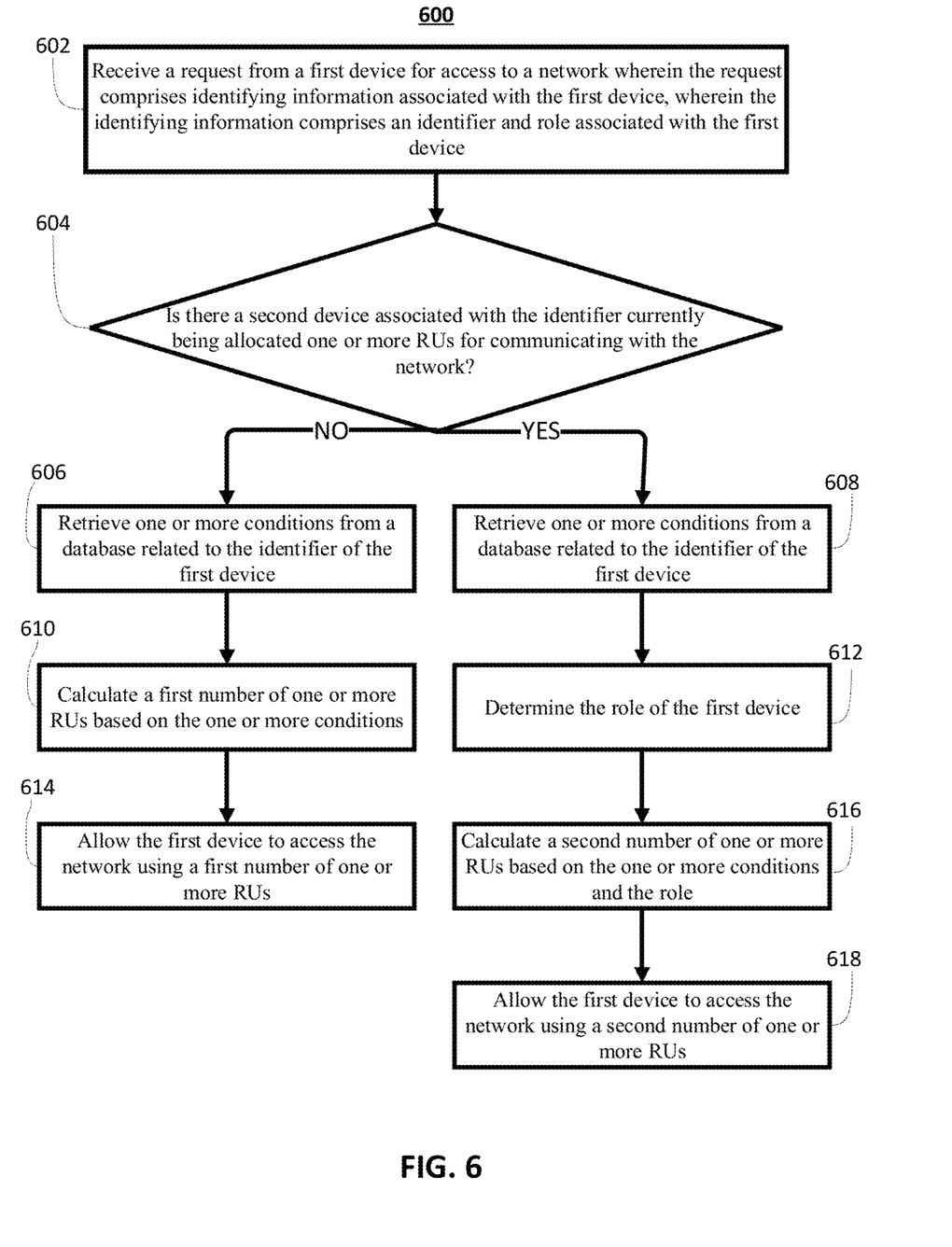
FIG. 6 is another flowchart of an illustrative process for providing a method of user-based resource allocation using OFDMA functionality, in accordance with some embodiments of the present disclosure.

FIG. 6 shows a flowchart of an illustrative process for providing a method of user-based resource allocation using OFDMA functionality, in accordance with some embodiments of the present disclosure. Process 600 may be performed by physical or virtual control circuitry, such as control circuitry 204 of device 200 (FIG. 2). For example, process 600 may be performed by control circuitries of WAP 102. In some embodiments, some steps of process 600 may be performed by one of several devices. For example, WAP 102 may be connected to a server that performs steps of process 600.

At step 602, control circuitry receives a request from a first device for access to a network, wherein the request comprises identifying information associated with the first device. In some embodiments, the request is received by an OFDMA receiver (e.g., OFDMA receiver 214 of device 200) and processed using control circuitry (e.g., control circuitry 204 of device 200). In some embodiments, the identifying information comprises an identifier and role associated with the first device. The identifier can be associated with the credentials (e.g., identification number, password, etc.) used to authenticate the first device. The identifier can be any identifier that can be used to associate the first device with a user or users. For example, the identifier may be a username, MAC address, email address, vendor-specific attribute (VSA), digital certificate, session ID, and/or any other similar such information. The role can be based on if the device is a personal device or an entity-provided device. For example, a personal device may receive a limited access role, whereas a device provided by the entity supporting the WLAN may receive a full access role.

At step 604, control circuitry determines whether there are any other devices, associated with the same identifier as the first device, currently being allocated one or more RUs for communicating with the network. The control circuitry can make this determination based on stored information relating to all devices that are being allocated one or more RUs for communicating with the network. For example, the control circuitry may use a table (e.g., table 300) stored in storage (e.g., storage 208 of device 200) to determine which devices are allocated one or more RUs. In some embodiments, the control circuitry queries the system to determine if there are any other devices, associated with the same identifier as the first device, being allocated one or more RUs for communicating with the network. If the control circuitry determines that there are not any other devices associated with the same identifier as the first device currently being allocated one or more RUs for communicating with the network, then the process 600 continues to step 606. If the control circuitry determines that there is another device associated with the same identifier as the first device being allocated one or more RUs for communicating with the network, then the process 600 continues to step 608.

At step 606 and step 608, control circuitry retrieves one or more conditions from a database related to the identifier of the first device. In some embodiments, the database is a table (e.g., table 350) stored in storage 208 of device 200 (FIG. 2). The control circuitry queries the database to find entries that correspond to the identifier associated with the first device.

At step 610, control circuitry calculates a first number of one or more RUs to provide to the first device. In some embodiments, the first number of one or more RUs is based on the one or more entries retrieved in step 606. The control circuitry calculates the first number of one or more RUs to provide to the first device based on the conditions. For example, a first condition can apply to instances when there is only one device associated with the same identifier being allocated one or more RUs. In some embodiments, the first condition is that the device is allocated more than one RU if available, but at least one. Based on the first condition, the control circuitry will determine that the first number of one or more RUs will be more than one RU if available, but at least one. In some embodiments, the available RUs may be determined by the first condition or other conditions stored in the storage (e.g., storage 208 of device 200) maintained by the WAP. In some embodiments, the available RUs are identifier- and/or device-specific. In some embodiments, the available RUs are based on the total number of devices connected to the WLAN or similar such information. At step 614, control circuitry, allows the first device to access the network using the first number of one or more RUs calculated in step 610.

At step 612, control circuitry determines the role of the first device. The role can be provided by the request sent from the first device in step 602. At step 616, control circuitry calculates a second number of one or more RUs to provide to the first device. In some embodiments, the second number of one or more RUs is based on the one or more entries retrieved in step 608 and the role determined in step 612. The control circuitry calculates the second number of one or more RUs to provide to the first device based on the conditions and the role. For example, a second condition applies to instances when there is more than one device associated with the same identifier being allocated one or more RUs. The second condition further indicates that devices with a full access role will be allocated more than one RU if available, but at least one RU, whereas devices with a limited access role will be allocated not more than one RU. Based on the second condition and the role of the first device, the control circuitry determines a second number of one or more RUs to provide to the first device. For example, if the first device has a full access role, the control circuitry will determine that the second number of one or more resource unit will be more than one RU if available, but at least one RU. If the first device has a limited access role, the control circuitry will determine that the second number of one or more resource unit will not be more than one RU. As discussed above, the available RUs may be determined by the second condition or other conditions stored in storage (e.g., storage 208 of device 200) maintained by the WAP. In some embodiments, the available RUs are identifier- and/or device-specific. In some embodiments, the available RUs are based on the total number of devices connected to the WLAN or similar such information. At step 618, control circuitry, allows the first device to access the network using the second number of one or more RUs calculated in step 616.

The processes 400, 500, and 600 described above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or-readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method comprising:
    storing, by an access point configured to communicate with a plurality of devices using orthogonal frequency-division multiple access (OFDMA), one or more conditions in a database, wherein the one or more conditions specify a number of one or more resource units to be allocated to a plurality of devices for communicating with a network;
    receiving, by the access point, a request, from a first device configured to communicate with the access point using OFDMA, for access to a network wherein the request comprises identifying information associated with the first device, wherein the identifying information comprises an identifier and role associated with the first device, wherein the role comprises a limited-access role or a full-access role;
    determining whether a second device associated with the identifier is currently being allocated one or more resource units for communicating with the network, wherein:
        when there is no second device associated with the identifier currently being allocated resource units for communicating with the network, determining, by the access point, a first number of one or more resource units to provide to the first device; and
        when there is the second device associated with the identifier currently being allocated one or more resource units for communicating with the network, determining, by the access point, a second number of one or more resource units to provide to the first device based on the role associated with the first device and the one or more conditions stored in the database; and
    allowing the first device to access the network using either the first number of one or more resource units or the second number of one or more resource units based on determining if the second device associated with the identifier is currently being allocated resource units for communicating with the network.

2. The method of claim 1, wherein the identifier is a username, MAC address, email address, vendor-specific attribute (VSA), digital certificate, or a session ID.

3. The method of claim 1, further comprising
    changing, by the access point, a third number of one or more resource units being allocated to the second device for communicating with the network based on the first device being allocated resource units for communicating with the network and the one or more conditions.

4. The method of claim 1, further comprising:
comparing the identifying information received from the first device with the one or more conditions stored in the database.

5. The method of claim 1, further comprising:
receiving, by the access point, a change to the one or more conditions in the database; and
in response to receiving the change to the one or more conditions in the database, changing either the first number of one or more resource units or the second number of one or more resource units being allocated to the first device for communication with the network based on the change to the one or more conditions in the database.

6. An apparatus comprising:
control circuitry; and
at least one memory including computer program code for one or more programs, the at least one memory and the computer program code configured to, with the control circuitry, cause the apparatus to perform at least the following:
store one or more conditions in a database, wherein the one or more conditions specify a number of one or more resource units to be allocated to a plurality of devices for communicating with a network;
receive a request, from a first device configured to communicate with the apparatus using orthogonal frequency-division multiple access (OFDMA), for access to a network wherein the request comprises identifying information associated with the first device, wherein the identifying information comprises an identifier and role associated with the first device, wherein the role comprises a limited-access role or a full-access role;
determine whether a second device, associated with the identifier, is currently being allocated one or more resource units for communicating with the network wherein; and
in response to determining that the second device associated with the identifier is currently being allocated one or more resource units for communicating with the network, determine a number of one or more resource units to provide to the first device based on the role associated with the first device and the one or more conditions stored in the database, wherein determining the number of one or more resource units to provide to the first device is done without user input.

7. The apparatus of claim 6, wherein the apparatus is further caused to allow the first device to access the network using the number of one or more resource units.

8. The apparatus of claim 7, wherein the apparatus is further caused to change a second number of one or more resource units being allocated to the second device for communicating with the network based on the first device being allocated the number of resource units for communicating with the network and the one or more conditions.

9. The apparatus of claim 7, wherein the apparatus is further caused to store, in the database, status information indicating that the first device is being allocated resource units for communicating with the network.

10. The apparatus of claim 7, wherein the apparatus is further caused to:
receive a change to the one or more conditions in the database; and
in response to receiving the change to the one or more conditions in the database, change the number of one or more resource units allocated to the first device for communication with the network based on the change to the one or more conditions in the database.

11. The apparatus of claim 6, wherein the apparatus is further caused to deny the first device access to the network based on the role associated with the first device and the one or more conditions stored in the database.

12. The apparatus of claim 6, wherein the apparatus is further caused to compare the identifying information received from the first device with the one or more conditions stored in the database.

13. A non-transitory computer-readable medium having instructions encoded thereon that when executed by control circuitry cause the control circuitry to:
store one or more conditions in a database, wherein the one or more conditions specify a number of one or more resource units to be allocated to a plurality of devices for communicating with a network, wherein the one or more conditions include a role associated with each one of the plurality of devices, and wherein the role comprises a limited-access role or a full-access role;
receive a request, from a first device of the plurality of devices configured to communicate with the control circuitry using orthogonal frequency-division multiple access (OFDMA), for access to a network, wherein the request comprises the role associated with the first device;
determine a number of one or more resource units to provide to the first device based on the one or more conditions in the database, the request received from the first device, and a number of one or more devices associated with the first device, wherein the one or more devices are currently being allocated resource units; and
allow the first device to access the network using the number of one or more resource units.

14. The non-transitory computer-readable medium of claim 13, wherein the first device and the number of one or more devices associated with the first device all share an identifier.

15. The non-transitory computer-readable medium of claim 14, wherein the one or more conditions used to determine the number of one or more resource units to provide to the first device indicates a maximum number of resource units to be allocated among all devices associated with the identifier.

16. The non-transitory computer-readable medium of claim 13, wherein the one or more conditions used to determine the number of one or more resource units to provide to the first device indicates a maximum number of resource units to be allocated to the first device.

17. The non-transitory computer-readable medium of claim 13, wherein the control circuitry is further configured to change a second number of one or more resource units being allocated to a second device for communicating with the network based on the first device being allocated the number of one or more resource units and the one or more conditions in the database.

18. The non-transitory computer-readable medium of claim 13, wherein the control circuitry is further configured to:

determine identifying information of the first device based on the request received from the first device; and compare the identifying information of the first device with the one or more conditions stored in the database.

19. The non-transitory computer-readable medium of claim 13, wherein the control circuitry is further configured to store, in the database, status information indicating that the first device is being allocated the number of one or more resource units for communicating with the network.

20. The non-transitory computer-readable medium of claim 13, wherein the control circuitry is further configured to:

receive a change to the one or more conditions in the database; and in response to receiving the change to the one or more conditions in the database, change the number of one or more resource units being allocated to the first device for communication with the network based on the change to the one or more conditions in the database.

* * * * *